Dec. 9, 1924.
H. BREWER
HOSE COUPLING
Filed Feb. 7, 1921
1,518,479
2 Sheets-Sheet 1
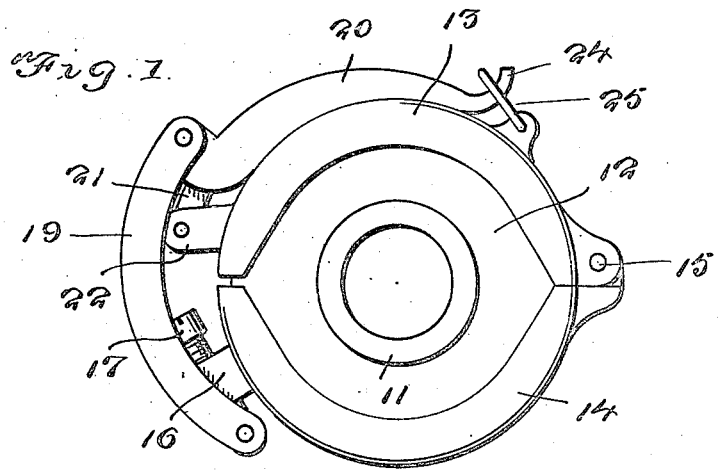
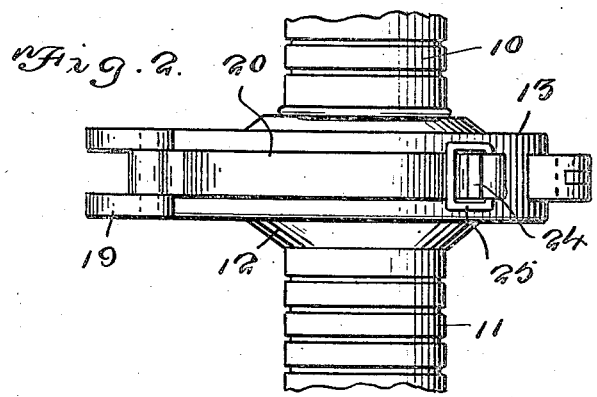
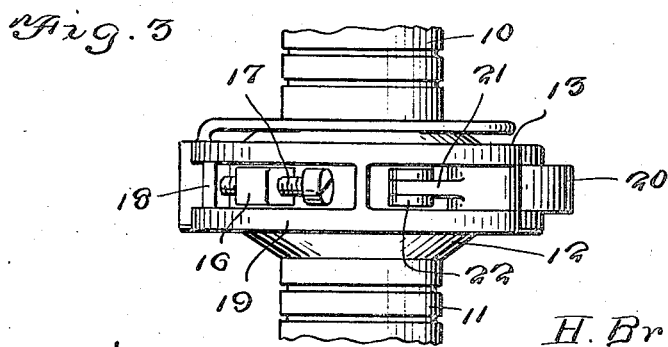
H. Brewer
INVENTOR
BY Victor J. Evans
ATTORNEY
WITNESS:

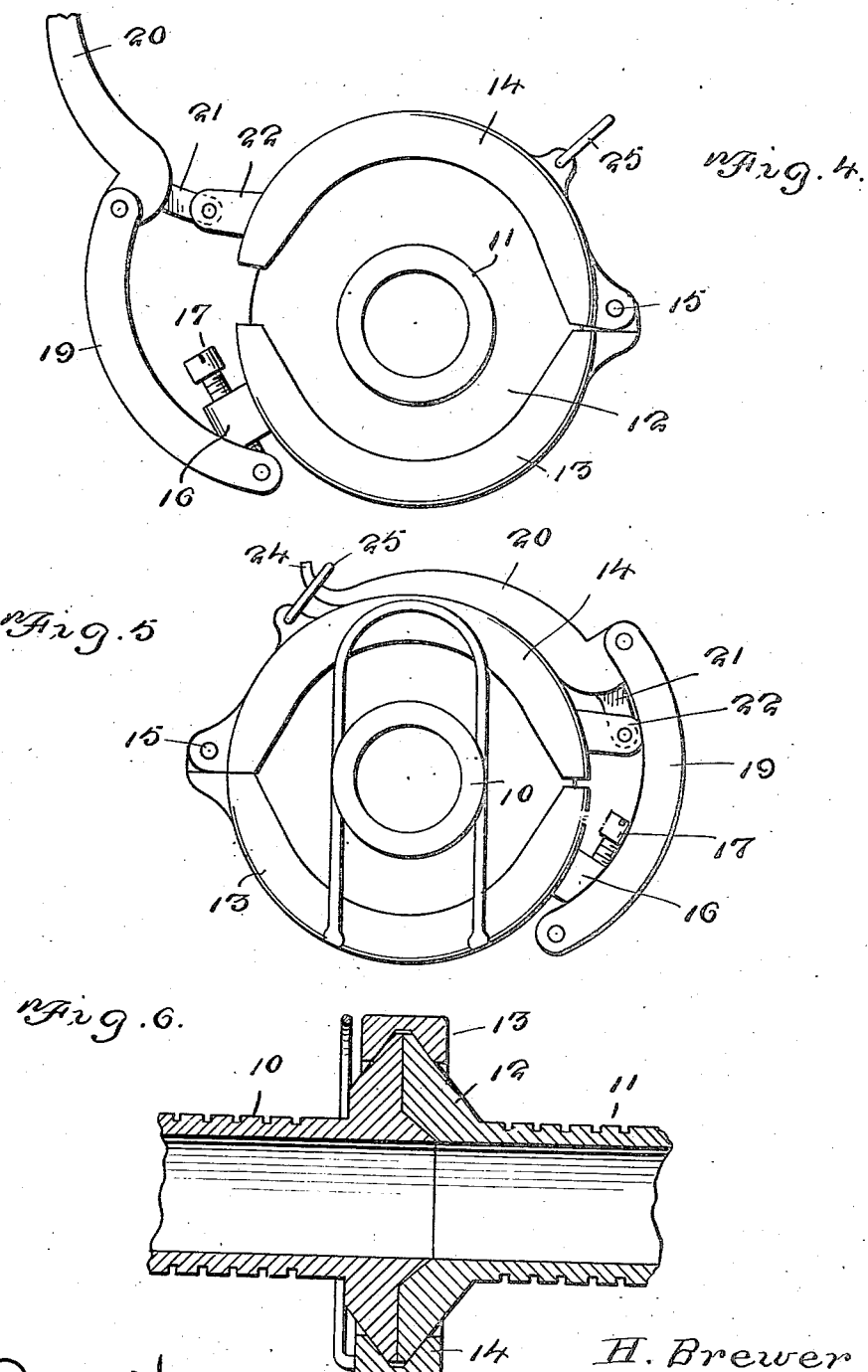

Patented Dec. 9, 1924.

1,518,479

UNITED STATES PATENT OFFICE.

HARRY BREWER, OF SIDNEY, NEBRASKA.

HOSE COUPLING.

Application filed February 7, 1921. Serial No. 443,095.

*To all whom it may concern:*

Be it known that I, HARRY BREWER, residing at Sidney, in the county of Cheyenne and State of Nebraska, have invented new and useful Improvements in Hose Couplings, of which the following is a specification.

This invention comprehends the provision of a pipe coupling designed to allow the ends of two pipe sections to be secured together in a quick and easy manner without the use of tools.

More specifically stated, the invention embodies a clamping annulus made up of two hingedly connected sections designed to embrace the meeting ends of the pipe sections, and supporting a combined clamp and locking lever susceptible of adjustment to compensate for wear so as to always provide a tight and fluid proof coupling.

Another object of the invention resides in equipping a coupling device with means for holding it associated with one end of the pipe sections where it is always in position for use.

The nature and advantages of the invention will be better understood when read in connection with the accompanying drawings, the invention residing in the construction, combination and arrangement of parts as claimed.

In the drawings forming part of this application, like numerals of reference indicate similar parts in the several views and wherein:

Figure 1— is a view of the coupling showing the parts of the clamp in position for use.

Figure 2— is a top plan view.

Figure 3— is a view taken at a right angle to Figure 1.

Figure 4— is a view similar to Figure 1, showing the parts of the clamp released.

Figure 5— is a view looking at the opposite sides of the coupling from that shown in Figure 1.

Figure 6— is a sectional view through the coupling.

Referring to the drawings in detail, 10 and 11 indicates the pipe sections each of which is provided with a flange 12. The coupling device forming the subject matter of my invention includes an annulus made up of two sections 13 and 14 respectively which are pivoted as at 15, each section being of channel formation in cross section. Projecting from the section 13 is a lug 16 through which passes a threaded adjusting element 17 for a purpose to be hereinafter described. This adjusting element is terminally connected with a cross piece 18 which is associated with a curved yolk 19, the latter being pivoted upon the cross piece 18 as shown. A combined clamping and locking lever 20 has one end pivoted between the spaced portions of the yolk 19, while projecting from the lever is a lug 21 pivoted between apertured ears 22 projecting from the section 14 of the annulus, thus providing a locking joint. The lever 20 is curved to conform to the curvature of the section 14 of the annulus against which it is ranged when in active position, the free end of the lever being upturned as at 24 and over which upturned portion a loop 25 is adapted to be arranged to hold the lever in its locking position. This loop is swingingly mounted upon the section 14 of the annulus. Also carried by the section 13 of the annulus is a substantially U-shaped element for embracing the section 10 of the pipe, thereby supporting the coupling device upon one of the pipe sections where it is always in position for use.

In practice, the flanges 11 of the pipe sections are arranged in face to face contact when the sections 13 and 14 of the annulus are opened. The lever 20 is then moved downwardly against the section 14 of the annulus, during which operation the sections of the annulus are brought together wholly embracing the flanges in a manner to prevent relative movement of the pipe sections. The lever is then held in its active position by the loop above referred to. In order to compensate for wear of the locking joint, the adjusting element 17 is provided, it being readily apparent that by adjusting the element 17 the position of the yoke can be varied with relation to the meeting ends of the sections 13 and 14 of said annulus.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

A coupling device of the character described comprising two pivotally connected semi-circular sections adapted to embrace the ends of a pair of pipe sections, each section being of channel formation in cross section, a lug projecting from one section adjacent the free end thereof, a threaded element adjustable within said lug, a cross piece associated with said adjusting element, a curved yoke terminally pivoted on said cross piece, a combined clamping and locking lever having one end pivoted to the opposite end of said yoke, apertured yokes projecting from the other section of the coupling adjacent its free end, a link pivoted between said ears and pivotally connected with said locking lever, a loop pivoted on the second mentioned section of the coupling at a point remote from its free end, and said locking lever terminating to provide a curved extremity adapted to be engaged by said loop for the purpose specified, and a U-shaped yoke carried by one of the semi-circular sections and slidably embracing one of the pipe sections.

In testimony whereof I affix my signature.

HARRY BREWER.